US012651846B2

(12) United States Patent
Yu et al.

(10) Patent No.: US 12,651,846 B2
(45) Date of Patent: Jun. 9, 2026

(54) ANTENNA DEVICE

(71) Applicants: INVENTEC (PUDONG) TECHNOLOGY CORPORATION, Shanghai (CN); INVENTEC CORPORATION, Taipei City (TW)

(72) Inventors: Chun-Wei Yu, Taipei City (TW); Shun-Cheng Xie, Taipei City (TW); Yu Shu Tai, Taipei City (TW); Hsin-Hung Lin, Taipei City (TW); Wei-Chen Cheng, Taipei City (TW)

(73) Assignees: INVENTEC (PUDONG) TECHNOLOGY CORPORATION, Shanghai (CN); INVENTEC CORPORATION, Taipei City (TW)

( * ) Notice: Subject to any disclaimer, the term of this patent is extended or adjusted under 35 U.S.C. 154(b) by 57 days.

(21) Appl. No.: 18/979,320

(22) Filed: Dec. 12, 2024

(65) Prior Publication Data

US 2026/0074436 A1 Mar. 12, 2026

(30) Foreign Application Priority Data

Sep. 12, 2024 (CN) ......................... 202411282311.1

(51) Int. Cl.
*H01Q 19/10* (2006.01)
*H01Q 21/00* (2006.01)

(52) U.S. Cl.
CPC ............. *H01Q 19/10* (2013.01); *H01Q 21/00* (2013.01)

(58) Field of Classification Search
CPC ................................ H01Q 19/10; H01Q 21/00
See application file for complete search history.

(56) References Cited

U.S. PATENT DOCUMENTS 4,749,997 A * 6/1988 Canonico ........... H01Q 21/0025 343/705
2010/0164831 A1* 7/2010 Rentz ....................... H01Q 9/42 343/848

FOREIGN PATENT DOCUMENTS

CN 204857953 U * 12/2015

* cited by examiner

*Primary Examiner* — Daniel D Chang
(74) *Attorney, Agent, or Firm* — Maschoff Brennan

(57) ABSTRACT

An antenna device includes a substrate and an antenna component. The antenna component is disposed on the substrate, and includes two hook-shaped excitation bodies, a guider, a reflector and an impedance matching body. The hook-shaped excitation bodies are spaced apart from each other and symmetrical to each other. Opposite ends of the hook-shaped excitation bodies are respective located opposite to each other. An end of one of the hook-shaped excitation bodies has a feeding end. An end of another one of the hook-shaped excitation bodies has a grounding end located opposite to the feeding end. The guider is located on a side of the hook-shaped excitation bodies. The reflector is located on a side of the hook-shaped excitation bodies located away from the guider. The impedance matching body includes an inductor. The inductor is located between the hook-shaped excitation bodies and the reflector.

10 Claims, 5 Drawing Sheets

10

10

ANTENNA DEVICE

CROSS-REFERENCE TO RELATED APPLICATIONS

This non-provisional application claims priority under 35 U.S.C. § 119(a) on Patent Application No(s). 202411282311.1 filed in China, on Sep. 12, 2024, the entire contents of which are hereby incorporated by reference.

BACKGROUND OF THE INVENTION

Technical Field of the Invention

The invention relates to an antenna device, more particularly to an antenna device including an excitation component, radiation components and an impedance matching component.

Description of the Related Art

With the advancement of mobile communication technology, various electronic devices are evolving to offer more diversified functions, become lighter and thinner, and achieve faster and more efficient data transmission. Nowadays, mobile communication technology has entered the 5G era. By using mobile communication technology corresponding to the frequency band of 5G, higher transmission rate of network services can be provided, thereby realizing technologies such as drones, remote medical surgery, virtual reality (VR) and augmented reality (AR).

In order to increase the coverage of signals corresponding to a frequency band of 5G for more stable and high-speed network services, more base stations or 5G small cells are required to be built. However, the return losses of the conventional antenna devices applied in the base stations or the 5G small cells are still too high to meet communication requirements for users. Therefore, improving the communication quality of the antenna device applied in the base station or the 5G small cell is one of the key issues that researchers need to address.

SUMMARY OF THE INVENTION

The invention provides an antenna device for improving the communication quality of the antenna device applied in the base station or the 5G small cell.

One embodiment of the invention provides an antenna device including a substrate and at least one antenna component. The at least one antenna component is disposed on the substrate, and includes two hook-shaped excitation bodies, a guider, a reflector and an impedance matching body. The two hook-shaped excitation bodies are spaced apart from each other and symmetrical to each other. Opposite ends of the two hook-shaped excitation bodies are respective located opposite to each other. An end of one of the two hook-shaped excitation bodies has a feeding end. An end of another one of the two hook-shaped excitation bodies has a grounding end. The feeding end and grounding end are located opposite to each other. The guider is located on a side of the two hook-shaped excitation bodies. The reflector is located on a side of the two hook-shaped excitation bodies located away from the guider. A side of the reflector located close to the two hook-shaped excitation bodies has two first straight edges and a curved edge. The two first straight edges are connected to two opposite sides of the curved edge. The curved edge is concave in a direction away from the two hook-shaped excitation bodies. The impedance matching body includes an inductor. The inductor is located between the two hook-shaped excitation bodies and the reflector.

According to the antenna device disclosed in the above embodiment, the antenna device applied in the base station or the 5G small cell includes the hook-shaped excitation bodies, the guider, the reflector and the impedance matching body, the hook-shaped excitation bodies are spaced apart from each other, the guider and the reflector are located on different sides of the hook-shaped excitation bodies, and the impedance matching body is located between the hook-shaped excitation bodies and the reflector, such that the antenna device can have or correspond to a frequency band covering the n78 and n79 frequency band of 5G, and the return loss of this frequency band can be reduced so as to meet communication requirements. Accordingly, the communication quality of the antenna device applied in the base station or the 5G small cell can be improved.

BRIEF DESCRIPTION OF THE DRAWINGS

The invention will become more fully understood from the detailed description given herein below and the accompanying drawings which are given by way of illustration only and thus are not limitative of the invention and wherein.

DETAILED DESCRIPTION

Figure 1:
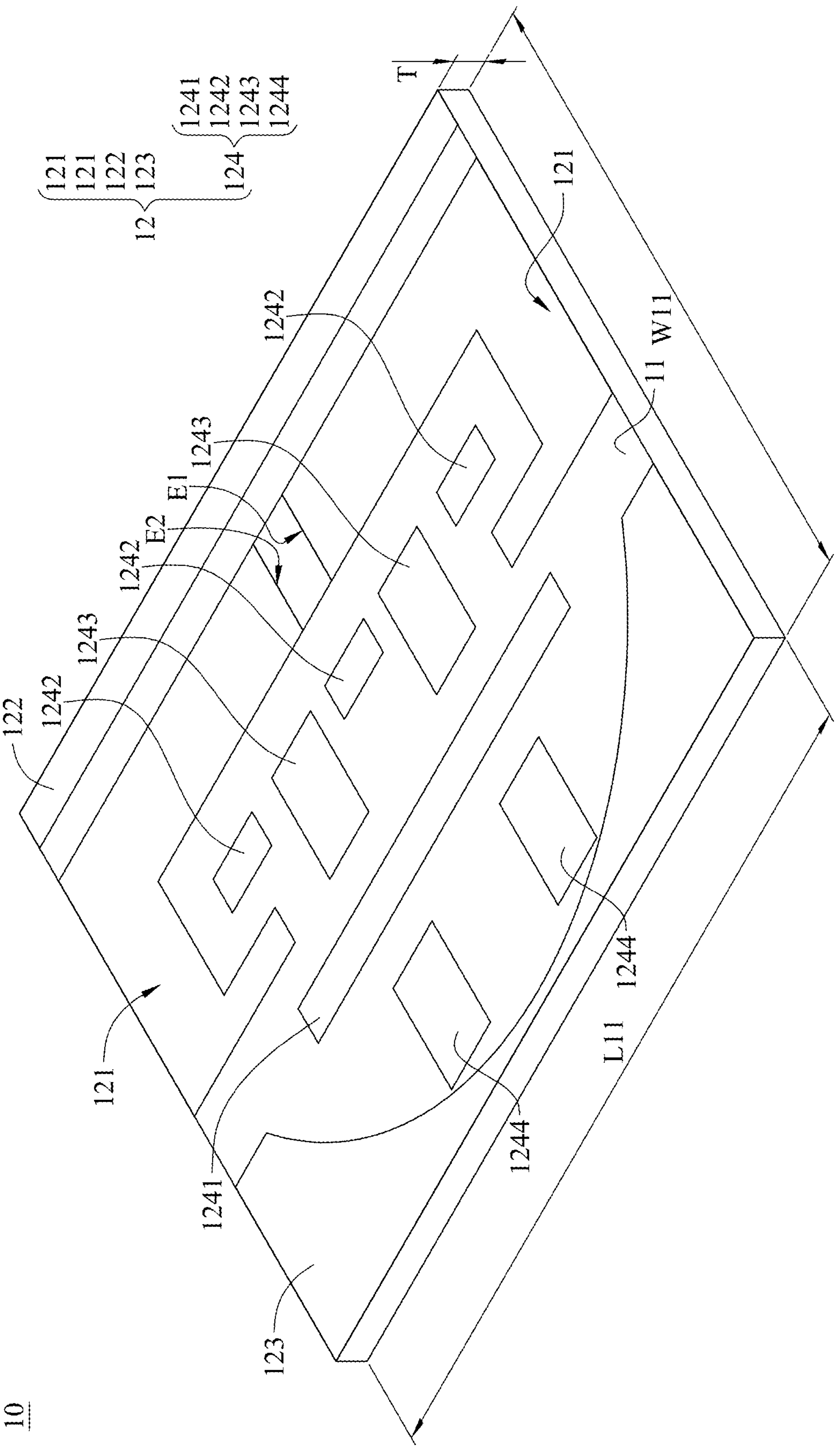
FIG. 1 is a perspective view of an antenna device in accordance with first embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the invention, such as technical and scientific terms, have its own meanings and can be comprehended by those skilled in the art, unless the terms are additionally defined in the invention. That is, the terms used in the following paragraphs should be read on the meaning commonly used in the related fields and will not be overly explained, unless the terms have a specific meaning in the invention.

Figure 2:
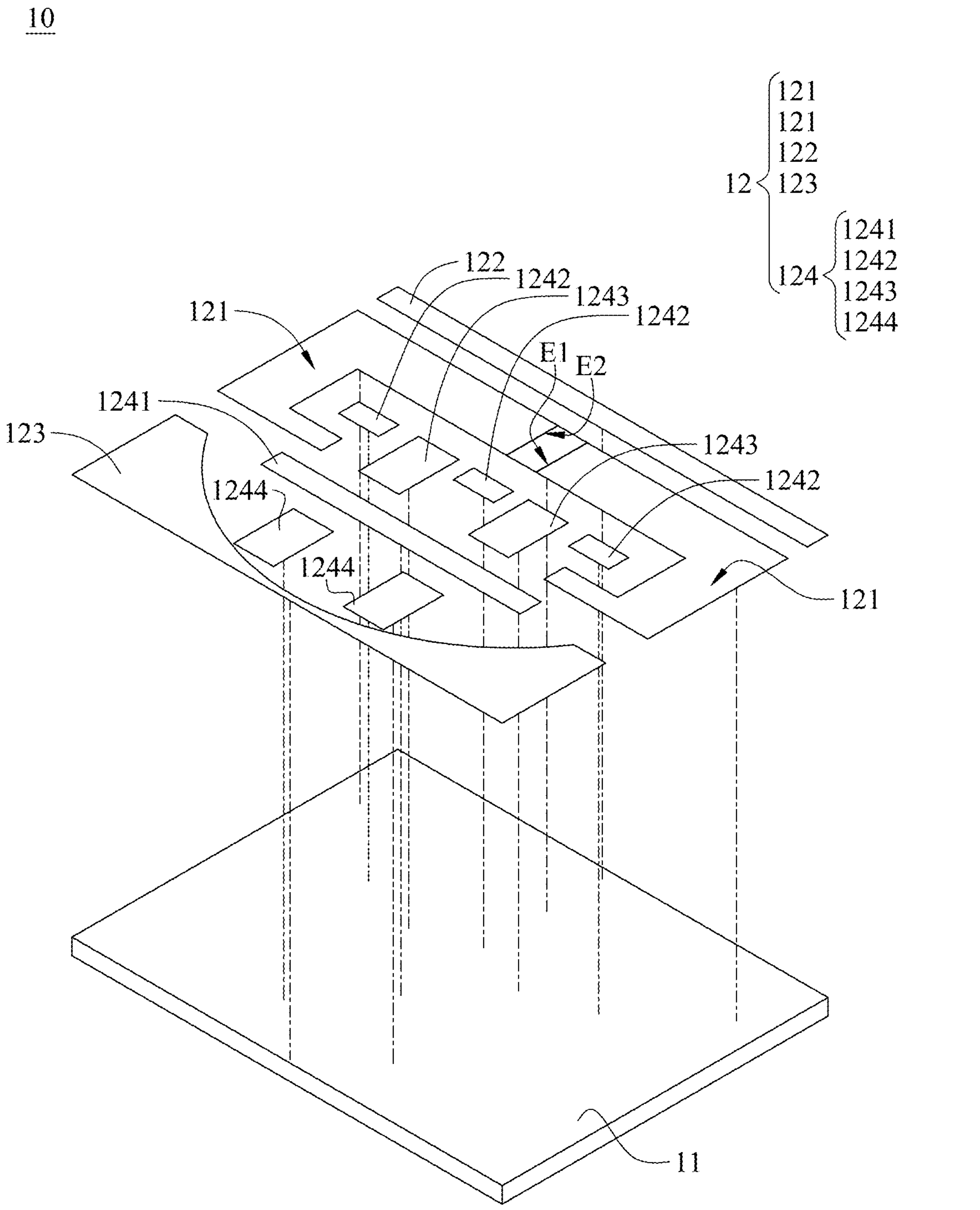
FIG. 2 is an exploded view of the antenna device in FIG. 1.
Figure 3:
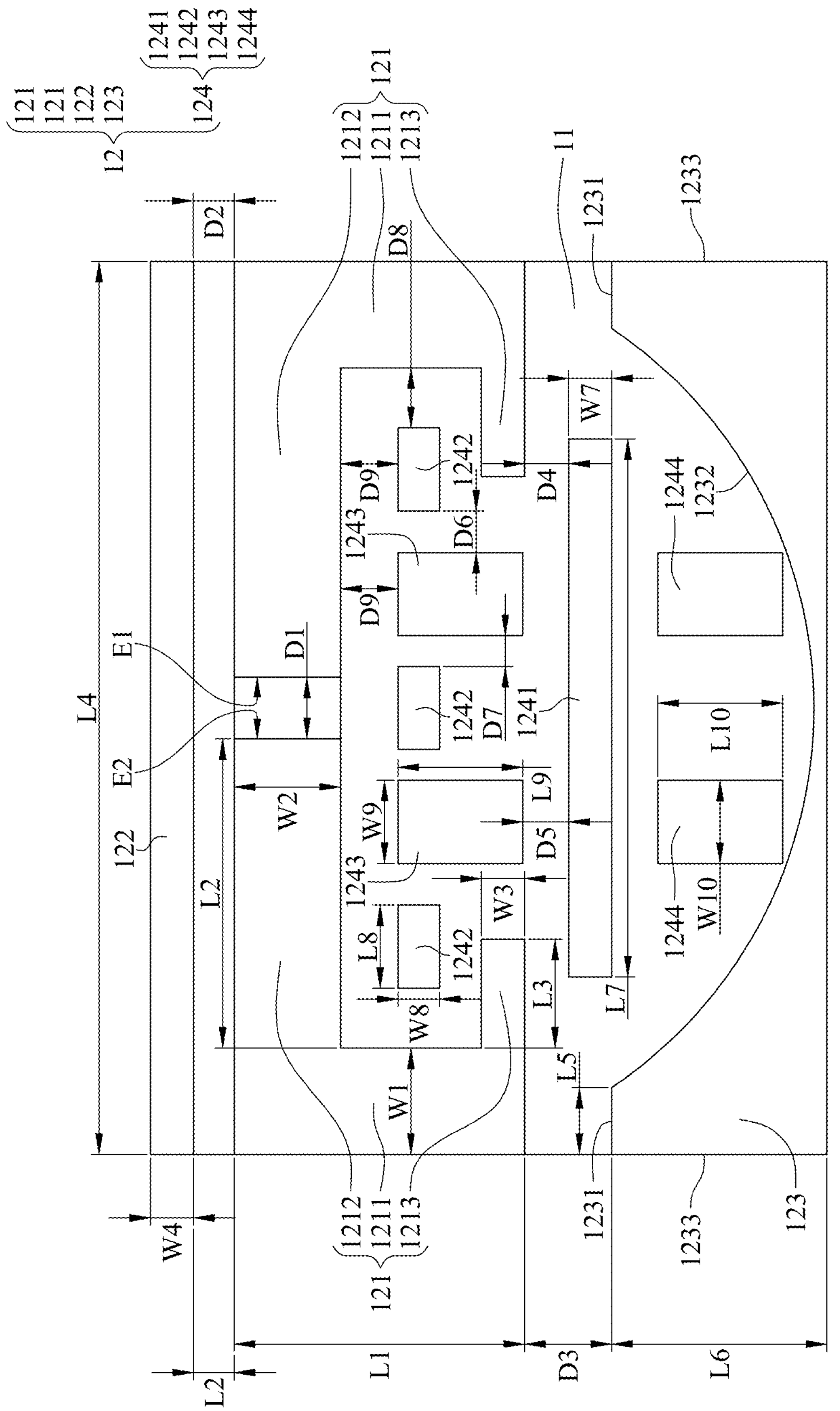
FIG. 3 is a top view of the antenna device in FIG. 1.

Please refer to FIG. 1 to FIG. 3, where FIG. 1 is a perspective view of an antenna device 10 in accordance with first embodiment of the invention, FIG. 2 is an exploded view of the antenna device 10 in FIG. 1, and FIG. 3 is a top view of the antenna device 10 in FIG. 1.

In this embodiment, the antenna device 10 is adapted for a multi-input multi-output (i.e. MIMO) antenna corresponding to an n78 and n79 frequency band of 5G (ranging from 3 GHz to 5 GHz), and is disposed in, for example, a base station or a 5G small cell. The antenna device 10 includes a substrate 11 and an antenna component 12. The antenna component 12 is disposed on the substrate 11. The substrate 11 is made of, for example, glass fiber material, and the substrate 11 is, for example, an FR4 board. A dielectric constant of the substrate 11 is, for example, 4.4, and the loss tangent of the substrate 11 is, for example, 0.02. Accordingly, the substrate 11 with a small size can be adopted for being placed into a small space in a device housing while widening a bandwidth of the frequency band correspond to the antenna component 12 and improving the isolation effect of the antenna component 12. The antenna component 12 includes two hook-shaped excitation bodies 121, a guider 122, a reflector 123 and an impedance matching body 124.

The hook-shaped excitation bodies 121 are, for example, dipole structures and may be copper foils. The hook-shaped excitation bodies 121 are spaced apart from each other and are, for example, symmetrical to each other. Opposite ends of the hook-shaped excitation bodies 121 are located opposite to each other. An end of one of the hook-shaped excitation bodies 121 has a feeding end E1. An end of another one of the hook-shaped excitation bodies 121 has a grounding end E2. The feeding end E1 and the grounding end E2 are located opposite to each other. The feeding end E1 is configured to be connected to an external feeding cable (not shown) for signals to be fed thereinto. The grounding end E2 is configured to be connected to an external grounded cable (not shown)

In detail, each of the hook-shaped excitation bodies 121 includes a first excitation section 1211, a second excitation section 1212 and a third excitation section 1213. The second excitation section 1212 and the third excitation section 1213 are connected to opposite ends of the first excitation section 1211, and are located on a same side of the first excitation section 1211. Two sides of the first excitation sections 1211 of the hook-shaped excitation bodies 121 located away from the second excitation sections 1212 of the hook-shaped excitation bodies 121 and located away from the third excitation sections 1213 of the hook-shaped excitation bodies 121 are respectively close to two opposite sides of the substrate 11. The second excitation sections 1212 of the hook-shaped excitation bodies 121 are located opposite to each other. The third excitation sections 1213 of the hook-shaped excitation bodies 121 are located opposite to each other. The second excitation sections 1212 of one of the hook-shaped excitation bodies 121 located away from the first excitation section 1211 has the feeding end E1. The second excitation sections 1212 of another one of the hook-shaped excitation bodies 121 located away from the first excitation section 1211 has the grounding end E2.

The guider 122 is, for example, a copper foil, and is configured to strengthen signals excited by the hook-shaped excitation bodies 121. The guider 122 is located on a side of the hook-shaped excitation bodies 121, and is located close to the second excitation sections 1212 of the hook-shaped excitation bodies 121. The reflector 123 is located on a side of the hook-shaped excitation bodies 121 away from the guider 122, and is configured to enhance the radiation directionality of signals excited by the hook-shaped excitation bodies 121. The reflector 123 is, for example, a copper foil. A side of the reflector 123 located close to the hook-shaped excitation bodies 121 has two first straight edges 1231 and a curved edge 1232. The two first straight edges 1231 are connected to two opposite sides of the curved edge 1232. The curved edge 1232 is concave in a direction away from the hook-shaped excitation bodies 121.

The impedance matching body 124 is, for example, a parasitic component, and is, for example, a copper foil. The impedance matching body includes an inductor 1241, a plurality of first capacitors 1242, a plurality of second capacitors 1243 and a plurality of third capacitors 1244. The inductor 1241 is, for example, a parasitic inductor. The inductor 1241 is at least partially located between the third excitation sections 1213 of the hook-shaped excitation bodies 121 and the reflector 123. The inductor 1241 is, for example, spaced apart from the two first straight edges 1231. A length L7 of the inductor 1241 is, for example, greater than a distance between the third excitation sections 1213 of the hook-shaped excitation bodies 121 and less than a length L4 of the guider 122.

The first capacitors 1242 are, for example, parallel capacitors. The first capacitors 1242 are located between the first excitation sections 1211 of the hook-shaped excitation bodies 121. The first capacitors 1242 are arranged along a straight line, and are spaced apart from each other. The second capacitors 1243 and the third capacitors 1244 are, for example, parasitic capacitors, and are, for example, symmetrical to each other. The second capacitors 1243 are located between the second excitation sections 1212 of the hook-shaped excitation bodies 121 and the inductor 1241. Each of the second capacitors 1243 is located between adjacent two of the first capacitors 1242. The third capacitors 1244 are located between the reflector 123 and the inductor 1241. Accordingly, the impedance matching body 124 can reduce a return loss of the antenna device 10 so as to enhance the impedance matching effect.

In this embodiment, the antenna device 10 applied in the base station or the 5G small cell includes the hook-shaped excitation bodies 121, the guider 122, the reflector 123 and the impedance matching body 124, the hook-shaped excitation bodies 121 are spaced apart from each other, the guider 122 and the reflector 123 are located on different sides of the hook-shaped excitation bodies 121, and the impedance matching body 124 is located between the hook-shaped excitation bodies 121 and the reflector 123, such that the antenna device 10 can have or correspond to a frequency band covering the n78 and n79 frequency band of 5G, and the return loss of this frequency band can be reduced so as to meet communication requirements. Accordingly, the communication quality of the antenna device 10 applied in the base station or the 5G small cell can be improved.

Generally, the higher the gain of the antenna is, the more concentrated the radiation from the antenna is, allowing the signals radiated from the antenna to be transmitted farther in a specific direction. In this embodiment, in the aforementioned frequency band of 5G, the antenna device 10, for example, has a gain of 1.87 dBi at a frequency of 3 GHz, has a gain of 1.34 dBi at a frequency of 3.5 GHz, has a gain of 1.61 dBi at a frequency of 4.5 GHz, and has a gain of 1.83 dBi at a frequency of 5 GHz.

In this embodiment, a length L1 of each of the first excitation sections 1211 of the hook-shaped excitation bodies 121 is, for example, 7 millimeters. A width W1 of each of the first excitation sections 1211 of the hook-shaped excitation bodies 121 is, for example, 2.6 millimeters. A length L2 of each of the second excitation sections 1212 of the hook-shaped excitation bodies 121 is, for example, 7.4 millimeters. A width W2 of each of the second excitation sections 1212 of the hook-shaped excitation bodies 121 is, for example, 2.5 millimeters. A distance D1 between the second excitation sections 1212 of the hook-shaped excitation bodies 121 is, for example, 1.4 millimeters. A length L3 of each of the third excitation sections 1213 of the hook-shaped excitation bodies 121 is, for example, 2.5 millimeters. A width W3 of each of the third excitation sections 1213 of the hook-shaped excitation bodies 121 is, for example, 1 millimeter.

In this embodiment, the length L4 of the guider 122 is, for example, 21.4 millimeters. A width W4 of the guider is, for example, 1 millimeter. A distance D2 between the guider 122 and each of the first excitation sections 1211 of the hook-shaped excitation bodies 121 or between the guider 122 and each of the second excitation sections 1212 of the hook-shaped excitation bodies 121 is, for example, 1 millimeter.

In this embodiment, the reflector 123 further includes two second straight edges 1233. Ends of the second straight edges 1233 are respectively connected to ends of the first straight edges 1231 located away from the curved edge 1232. The second excitation sections 1212 of the hook-shaped excitation bodies 121, the third excitation sections 1213 of the hook-shaped excitation bodies 121, the inductor 1241 and the first straight edges are, for example, parallel to each other. A length L5 of each of the first straight edges 1231 is, for example, less than the width W1 of each of the first excitation sections 1211 of the hook-shaped excitation bodies 121 and greater than 1 millimeter. A length L6 of the second straight edges 1233 is, for example, 5.1 millimeters. A distance D3 between the first straight edges 1231 and the first excitation sections 1211 of the hook-shaped excitation bodies 121 is, for example, 2.1 millimeters.

In this embodiment, the length L7 of the inductor 1241 is, for example, 12.9 millimeters. A width W7 of the inductor 1241 is, for example, 1.03 millimeters. A distance D4 between the inductor 1241 and the third excitation sections 1213 of the hook-shaped excitation bodies 121 is, for example, 1 millimeter. A length L8 of each of the first capacitors 1242 is, for example, 2 millimeters. A width W8 of each of the first capacitors 1242 is, for example, 1 millimeter. A length L9 of each of the second capacitors 1243 and a length L10 of each of the third capacitors 1244 are, for example, 3 millimeters. A width W9 of each of the second capacitors 1243 and a width W10 of each of the third capacitors 1244 are, for example, 2 millimeters. A distance D5 between the second capacitors 1243 and the inductor 1241 is, for example, 1.1 millimeters. A distance D6 between each of the second capacitors 1243 and one of the two adjacent first capacitors 1242 is, for example, 1 millimeter. A distance D7 between each of the second capacitors 1243 and another one of the two adjacent first capacitors 1242 is, for example, 0.7 millimeter. A distance D8 between one of the first capacitors 1242 located closest to the first excitation section 1211 of one of the hook-shaped excitation bodies 121 and the first excitation section 1211 is, for example, 1.4 millimeters. A distance D9 between the first capacitors 1242 and the second excitation sections 1212 of the hook-shaped excitations 121 or between the second capacitors 1243 and the second excitation sections 1212 of the hook-shaped excitations 121 is, for example, 1.4 millimeters.

In this embodiment, a length L11 of the substrate 11 is, for example, 21.4 millimeters. A width W11 of the substrate 11 is, for example, 16.2 millimeters. A thickness T of the substrate 11 is, for example, 0.8 millimeters.

In this embodiment, the impedance matching body 124 includes the inductor 1241, the first capacitors 1242, the second capacitors 1243 and the third capacitors 1244, but the invention is not limited thereto. In other embodiments, the impedance matching body may omit the second capacitors and the third capacitors, or the impedance matching body may omit the first capacitors, the second capacitors and the third capacitors.

Figure 4:
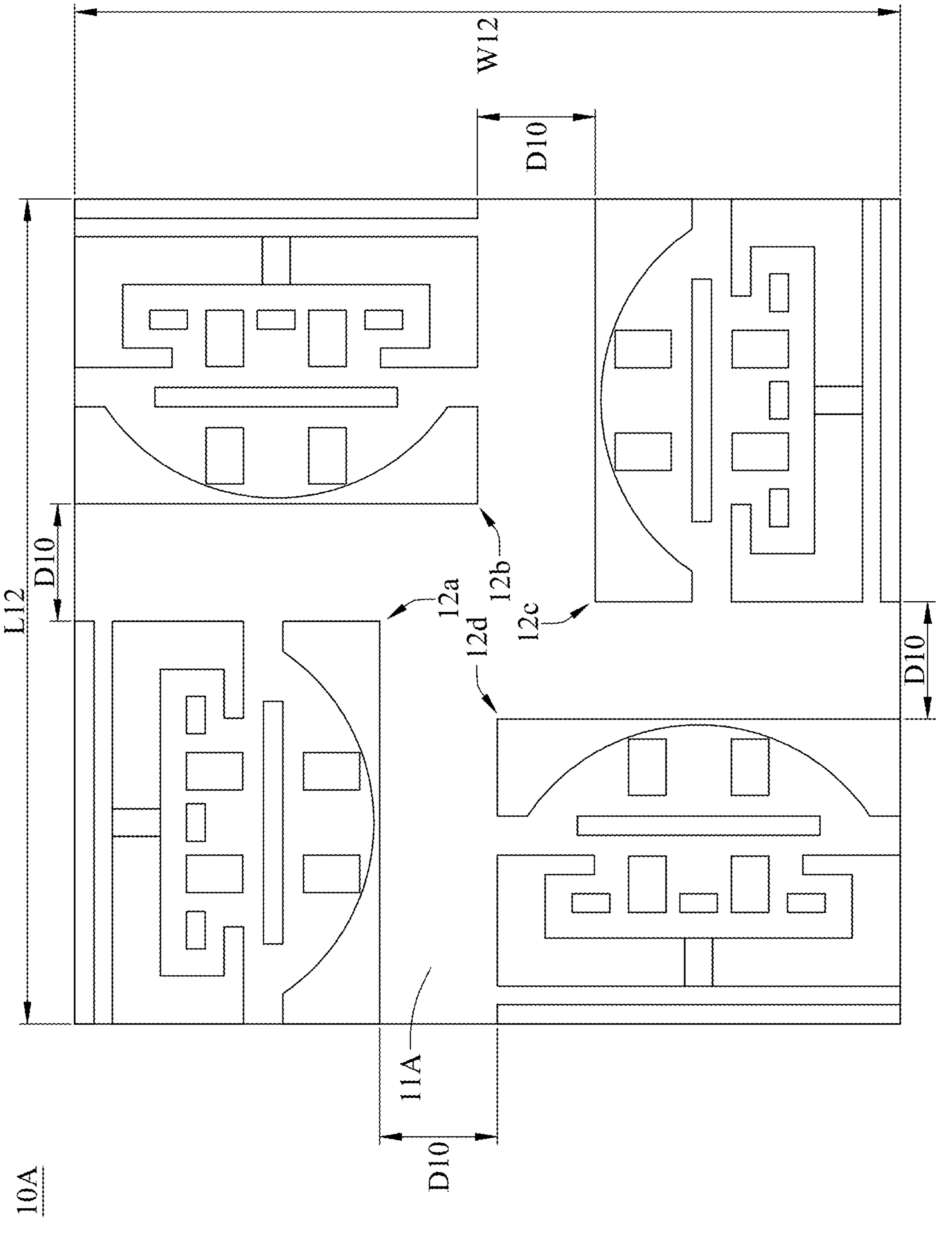
FIG. 4 is a top view of an antenna device in accordance with second embodiment of the invention.
Figure 5:
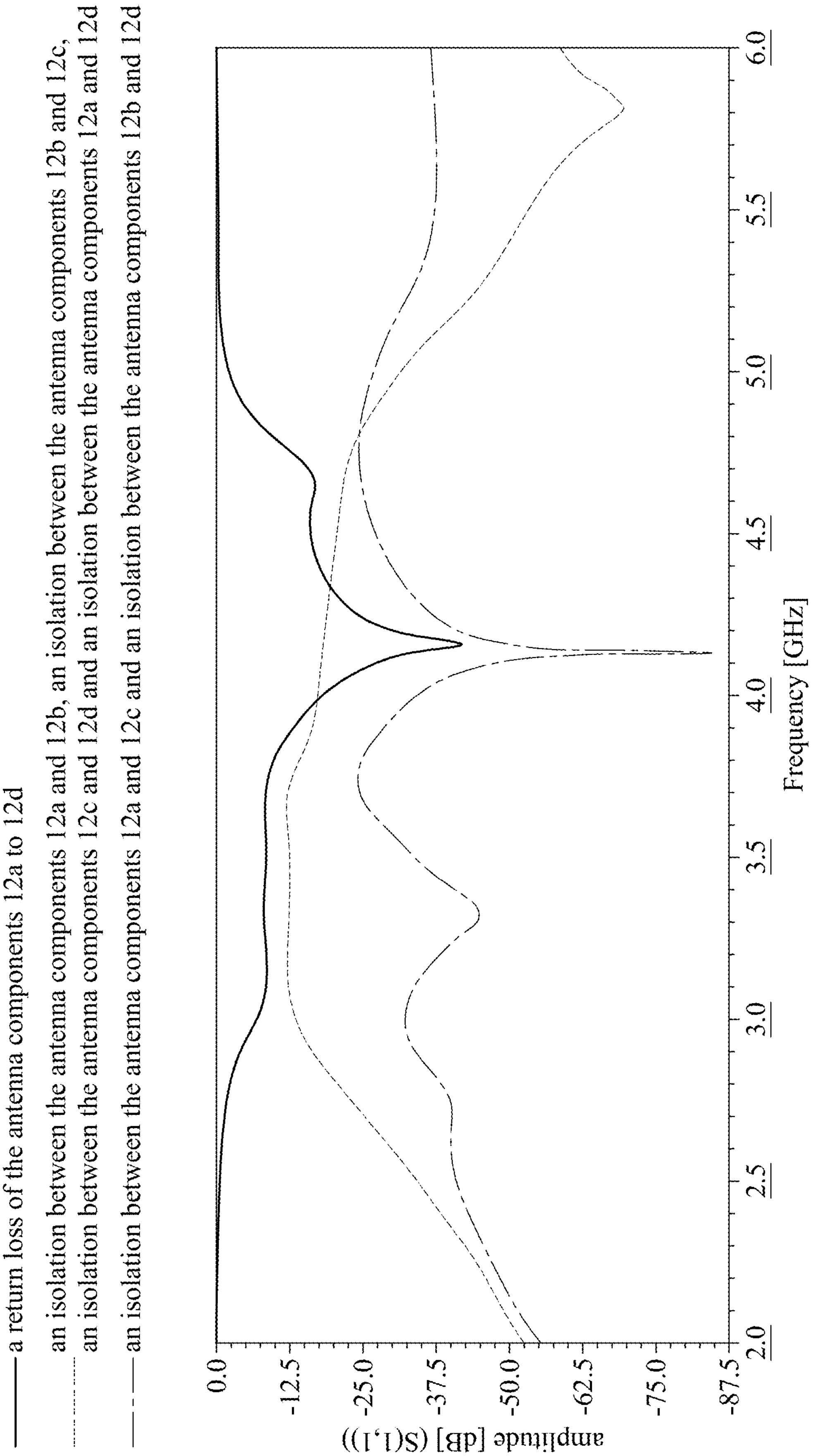
FIG. 5 is a graph showing return loss and isolation of the antenna device in FIG. 4.

In this embodiment, the antenna device 10 includes one antenna component 12 merely, but the invention is not limited thereto. In other embodiments, please refer to FIG. 1 to FIG. 3, where FIG. 4 is a perspective view of an antenna device 10A in accordance with second embodiment of the invention, and FIG. 5 is a graph showing return loss and isolation of the antenna device 10A in FIG. 4.

In this embodiment, the antenna device 10A is, for example, a four-receiving four-transmitting antenna. That is, the antenna device 10A includes four antenna components 12*a* to 12*d*, but the invention is not limited thereto. The antenna components 12*a* to 12*d* are disposed a substrate 11A, and are, for example, arranged in an array. The arrangement directions of adjacent two of the antenna components 12*a* to 12*d* is different from each other by an angle, such as 90 degrees. A distance D10 between adjacent two of the antenna components 12*a* to 12*d* is, for example, 6.26 millimeters. In addition, a length L12 of the substrate 11A is, for example, 44 millimeters. A width W12 of the substrate 11A is, for example, 44 millimeters. A thickness (not shown) of the substrate 11A is, for example, 0.8 millimeters, equal to the thickness T of the substrate 11 of the first embodiment.

In this embodiment, in the n78 and n79 frequency band of 5G (ranging from 3 GHz to 5 GHz), the return loss of the antenna device 10A is slightly greater than −6 dB in a few part of the aforementioned frequency band while the return loss of the antenna device 10A is less than −6 dB or even less than −10 dB in the rest part of the aforementioned frequency band. That is, the antenna device 10A has a desired impedance matching via the aforementioned structural design.

In the n78 and n79 frequency band of 5G, an isolation between the antenna components 12*a* located on a upper left corner of the substrate 11A and the antenna components 12*b* located on a upper right corner of the substrate 11A, an isolation between the antenna components 12*b* located on the upper right corner of the substrate 11A and the antenna components 12*c* located on a lower right corner of the substrate 11A, an isolation between the antenna components 12*c* located on the lower right corner of the substrate 11A and the antenna components 12*d* located on a lower left corner of the substrate 11A and an isolation between the antenna components 12*a* located on the upper left corner of the substrate 11A and the antenna components 12*d* located on the lower left corner of the substrate 11A are less than −12 dB. An isolation between the antenna components 12*a* located on the upper left corner of the substrate 11A and the antenna components 12*c* located on the lower right corner of the substrate 11A and an isolation between the antenna components 12*b* located on the upper right corner of the substrate 11A and the antenna components 12*d* located on the lower left corner of the substrate 11A are less than −24 dB. Accordingly, the antenna device 10A has a desired isolation via the aforementioned structural design.

According to the antenna device disclosed in the above embodiment, the antenna device applied in the base station or the 5G small cell includes the hook-shaped excitation bodies, the guider, the reflector and the impedance matching body, the hook-shaped excitation bodies are spaced apart from each other, the guider and the reflector are located on different sides of the hook-shaped excitation bodies, and the impedance matching body is located between the hook-shaped excitation bodies and the reflector, such that the antenna device can have or correspond to a frequency band covering the n78 and n79 frequency band of 5G, and the return loss of this frequency band can be reduced so as to meet communication requirements. Accordingly, the communication quality of the antenna device applied in the base station or the 5G small cell can be improved.

It will be apparent to those skilled in the art that various modifications and variations can be made to the invention. It is intended that the specification and examples be considered as exemplary embodiments only, with the scope of the invention being indicated by the following claims.

What is claimed is:

1. An antenna device, comprising:

a substrate; and at least one antenna component, disposed on the substrate and comprising:

two hook-shaped excitation bodies, wherein the two hook-shaped excitation bodies are spaced apart from each other and symmetrical to each other, opposite ends of the two hook-shaped excitation bodies are respectively located opposite to each other, an end of one of the two hook-shaped excitation bodies has a feeding end, an end of another one of the two hook-shaped excitation bodies has a grounding end, and the feeding end and the grounding end are located opposite to each other;

a guider, located on a side of the two hook-shaped excitation bodies;

a reflector, located on a side of the two hook-shaped excitation bodies located away from the guider, wherein a side of the reflector located close to the two hook-shaped excitation bodies has two first straight edges and a curved edge, the two first straight edges are connected to two opposite sides of the curved edge, and the curved edge is concave in a direction away from the two hook-shaped excitation bodies; and an impedance matching body, comprising an inductor, wherein the inductor is located between the two hook-shaped excitation bodies and the reflector.

2. The antenna device according to claim 1, wherein each of the two hook-shaped excitation bodies comprises a first excitation section, a second excitation section and a third excitation section, the second excitation section and the third excitation section are connected to opposite ends of the first excitation section and are located on a same side of the first excitation section, two sides of the first excitation sections of the two hook-shaped excitation bodies located away from the second excitation sections of the two hook-shaped excitation bodies and located away from the third excitation sections of the two hook-shaped excitation bodies are respectively close to two opposite sides of the substrate, the second excitation sections of the two hook-shaped excitation bodies are located opposite to each other, the third excitation sections of the two hook-shaped excitation bodies are located opposite to each other, the second excitation section of one of the two hook-shaped excitation bodies located away from the first excitation section has the feeding end, the second excitation section of another one of the two hook-shaped excitation bodies located away from the first excitation section has the grounding end, the guider is located close to the second excitation sections of the two hook-shaped excitation bodies, and the inductor is at least partially located between the third excitation sections of the two hook-shaped excitation bodies and the reflector.

3. The antenna device according to claim 2, wherein the impedance matching body further comprises a plurality of first capacitors, the plurality of first capacitors are located between the first excitation sections of the two hook-shaped excitation bodies, and the plurality of first capacitors are arranged along a straight line and are spaced apart from each other.

4. The antenna device according to claim 3, wherein the impedance matching body further comprises a plurality of second capacitors and a plurality of third capacitors, the plurality of second capacitors are located between the second excitation sections of the two hook-shaped excitation bodies and the inductor, each of the plurality of second capacitors is located between adjacent two of the plurality of first capacitors, and the plurality of third capacitors are located between the reflector and the inductor.

5. The antenna device according to claim 4, wherein a length of the inductor is greater than a distance between the third excitation sections of the two hook-shaped excitation bodies and less than a length of the guider.

6. The antenna device according to claim 5, wherein a length of the inductor is 12.9 millimeters, a width of the inductor is 1.03 millimeters, a distance between the inductor and the third excitation sections of the two hook-shaped excitation bodies is 1 millimeter, a length of each of the plurality of first capacitors is 2 millimeters, a width of each of the plurality of first capacitors is 1 millimeter, a length of each of the plurality of second capacitors and a length of each of the plurality of third capacitors are 3 millimeters, a width of each of the plurality of second capacitors and a width of each of the plurality of third capacitors are 2 millimeters, a distance between the plurality of second capacitors and the inductor is 1.1 millimeters, a distance between each of the plurality of second capacitors and one of adjacent two of the plurality of first capacitors is 1 millimeter, a distance between each of the plurality of second capacitors and another one of adjacent two of the plurality of first capacitors is 0.7 millimeter, a distance between one of the plurality of first capacitors closest to the first excitation section of one of the two hook-shaped excitation bodies and the first excitation section is 1.4 millimeters, and a distance between the plurality of first capacitors and the second excitation sections of the two hook-shaped excitation or a distance between the plurality of second capacitors and the second excitation sections of the two hook-shaped excitation is 1.4 millimeters.

7. The antenna device according to claim 2, wherein a length of each of the first excitation sections of the two hook-shaped excitation bodies is 7 millimeters, a width of each of the first excitation sections of the two hook-shaped excitation bodies is 2.6 millimeters, a length of each of the second excitation sections of the two hook-shaped excitation bodies is 7.4 millimeters, a width of each of the second excitation sections of the two hook-shaped excitation bodies is 2.5 millimeters, a distance between the second excitation sections of the two hook-shaped excitation bodies is 1.4 millimeters, a length of each of the third excitation sections of the two hook-shaped excitation bodies is 2.5 millimeters, and a width of each of the third excitation sections of the two hook-shaped excitation bodies is 1 millimeter.

8. The antenna device according to claim 2, wherein a length of the guider is 21.4 millimeters, a width of the guider is 1 millimeter, and a distance between the guider and each of the first excitation sections of the two hook-shaped excitation bodies or a distance between the guider and each of the second excitation sections of the two hook-shaped excitation bodies is 1 millimeter.

9. The antenna device according to claim 2, wherein the reflector further comprises two second straight edges, ends of the two second straight edges are respectively connected to ends of the two first straight edges located away from the curved edge, the second excitation sections of the two hook-shaped excitation bodies, the third excitation sections of the two hook-shaped excitation bodies, the inductor and the two first straight edges are parallel to each other, a length of each of the two first straight edges is less than a width of the first excitation sections of the two hook-shaped excitation bodies and greater than 1 millimeter, a length of the two second straight edges is 5.1 millimeters, and a distance between the two first straight edges and the first excitation sections of the two hook-shaped excitation bodies is 2.1 millimeters.

10. The antenna device according to claim 1, wherein the antenna device comprises a plurality of antenna components, the plurality of antenna components are arranged in an array, the arrangement directions of adjacent two of the plurality of antenna components is different from each other by an angle of 90 degrees, and a distance between any adjacent two of the plurality of antenna components is 6.26 millimeters.

* * * * *